Aug. 11, 1964  E. B. ANDERSON  3,143,867

ANTI-BACKLASH SLIP JOINT

Filed June 15, 1960

INVENTOR
Edmund B. Anderson
BY
McCanna, Morsbach & Pillote
ATTORNEYS

United States Patent Office 3,143,867
Patented Aug. 11, 1964

3,143,867
ANTI-BACKLASH SLIP JOINT
Edmund B. Anderson, 2135 10th St., Rockford, Ill., assignor of one-half to said Anderson and one-half to Walter H. Stark, Rockford, Ill.
Filed June 15, 1960, Ser. No. 36,326
6 Claims. (Cl. 64—23)

This invention relates to improvements in sliding joints.

An important object of this invention is to provide a sliding joint for transmitting torque from one rotatable element to another in which the backlash or lost motion between the relatively sliding parts of the joint can be adjusted to minimize or eliminate the backlash.

Another object of this invention is to provide a sliding joint in accordance with the foregoing objects which will also enable adjustment of the radial fit between the relatively moving parts of the joint.

A more particular object of this invention is to provide a sliding joint for transmitting torque, including an inner shaft member and an outer sleeve surrounding the shaft member, in which one of the members has a plurality of keys extending into keyways in the other member and the keys are angularly adjustable relative to each other to reduce backlash between the relatively sliding members.

Yet another object of this invention is to provide a slip joint in accordance with the foregoing object and which employs anti-friction elements to slidably interconnect the relatively moving members.

Still another object of this invention is to provide a slip joint which can be easily and economically fabricated and which can be adjusted after installation of the joint to compensate for backlash and any wear which occurs in the joint.

These, together with various ancillary objects and advantages of this invention will be more readily appreciated as the same becomes better understood by reference to the following detailed description when taken in connection with the accompanying drawings wherein.

The slip joint in general includes a shaft member 10, a sleeve member 11 surrounding the shaft member and keys and keyways on the interengaging faces of the members for slidably and non-rotatably connecting the members. In accordance with the present invention, provision is made for adjusting the joint to compensate for backlash which occurs due to manufacturing clearances and wear between the relatively moving parts. While the present invention is generally adapted for use in slip joints, it is herein specifically shown applied to a slip joint of the type shown in the patent to Edmund B. Anderson No. 2,908,152.

Figure 3:
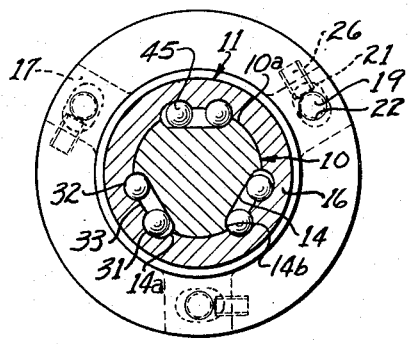
FIG. 3 is a transverse sectional view taken on the plane 3—3 of FIG. 1.

The shaft 10 has a generally cylindrical outer surface 10a and one or more longitudinally extending grooves 14 formed in its outer periphery. In the embodiment illustrated, three such grooves are provided and each defines longitudinally extending flanges 14a and 14b along opposite side edges thereof. For reasons set forth hereinafter, the flanges 14a and 14b are preferably arcuate in cross-section to conform to the contour of the ball elements which engage the same. The sleeve member 11 is formed in two axially aligned sections designated 15 and 16. The sections have flanges 17 and 18 on their adjacent ends and fasteners 19 extend through arcuate slots 21 in one of the flanges such as 17 and are threaded into openings 22 in the other of the flanges to secure the sections together in endwise abutting relation. The end of the flange 17 on one of the sections may be recessed as indicated at 23 to receive an axially extending projection 24 on the other of the sections to assure maintaining the sleeve sections in axial alignment with each other. As best shown in FIG. 3, the arcuate slots 21 are disposed concentric with the sleeve member and means such as set screws 26 are threaded into the flanges 17 and engage the fasteners 19 to angularly adjust the sleeve sections relative to each other. After adjustment, the fasteners 19 are tightened to lock the sleeve sections in the adjusted position.

Figure 1:
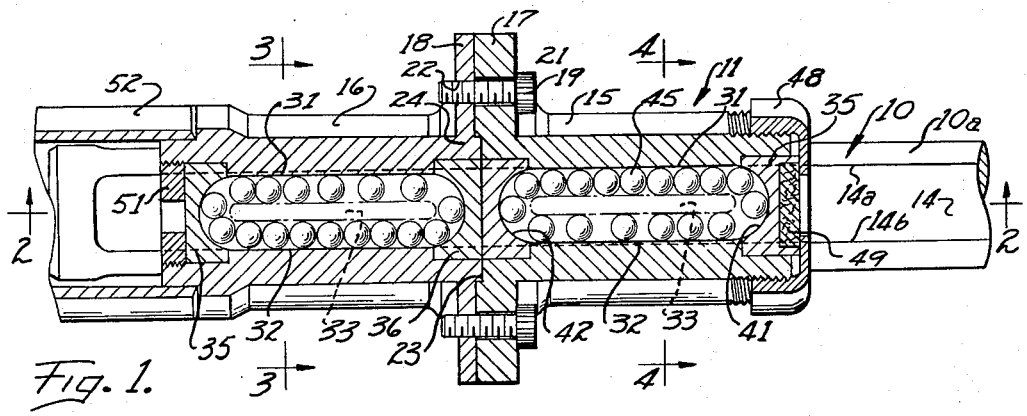
FIGURE 1 is a sectional view through the slip joint taken on the plane 1—1 of FIG. 2.
Figure 2:
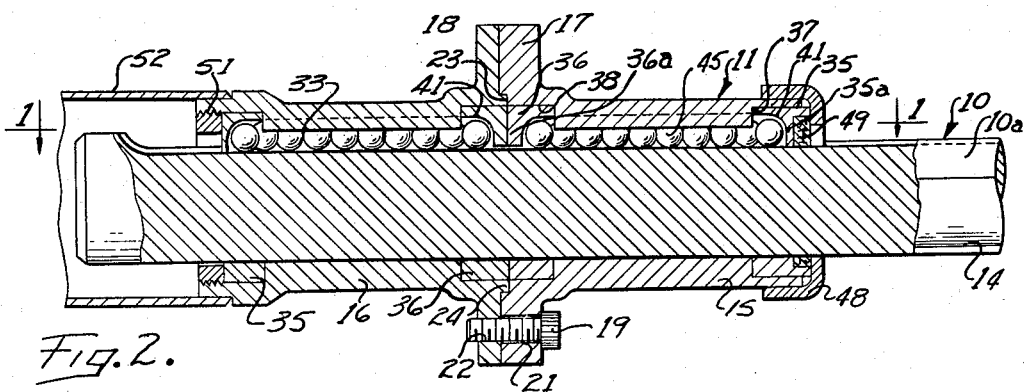
FIG. 2 is a longitudinal sectional view through the slip joint taken through the center of the joint on the plane 2—2 of FIG. 1.

The sleeve sections 15 and 16 each have key means thereon which extend into the keyways defined by the grooves 14 in the shaft member to slidably and non-rotatably interconnect the members. In the embodiment shown, a plurality of continuous ball raceways are formed in each of the sleeve sections at the interface between the sleeves and shaft. In particular, the sleeve sections 15 and 16 each have a plurality of pairs of longitudinally extending semi-cylindrical grooves 31 and 32 formed in the inner surface thereof, which grooves are annularly spaced apart and define a guide rib 33 therebetween. The number of pairs of grooves in the sleeve sections corresponds to the number of grooves 14 in the shaft and, as shown, three such pair of grooves are provided in each sleeve section. Arcuate guideways are provided at the ends of each of the sleeve sections 15 and 16 to guide the anti-friction ball elements from one groove of each pair of grooves in the sleeve sections crosswise of the associated groove in the shaft 10 into the other of the grooves in the sleeve. For this purpose, ring members 35 and 36 are non-rotatably disposed in counterbores 37 and 38 respectively in the opposite ends of each sleeve section. The rings 35 and 36 each loosely surround the shaft 10 and preferably have portions 35a and 36a respectively which extend into the grooves 14 in the shaft. Arcuate recesses 41 and 42 are formed in the inner faces of the rings 35 and 36, with each recess individual to one of the grooves in the shaft to define the aforementioned arcuate guideways at the ends of each pair of grooves in the sleeve. The arcuate recesses 41 and 42 extend crosswise of the grooves in the shaft and, as shown in FIG. 1, have a depth at the midpoint thereof slightly greater than the diameter of the anti-friction ball elements so as to guide the same across the end of the guide ribs. The longitudinal guideways formed by each pair of grooves in the sleeve and the arcuate guideways formed by the recesses in the end rings together define an endless path or ball race, and a set of anti-friction elements designated 45 are disposed in each of the endless paths to substantially fill the same. As shown, the rings 36 at the adjacent ends of the sleeve sections are retained in position by clamping of the sleeve sections together, and a collar 48 is provided at the outer end of the sleeve section 15 to retain the ring 35 assembled thereon. A resilient wiper ring 49, of felt or other like material, is provided to prevent the entrance of foreign matter into the sleeve and the antifriction bearing elements. The ring 35 at the end of the other sleeve section 16 is retained in position, as by a threaded locking ring 51 and, after assembly of the ring 35 on the sleeve section 16, a torque tube 52 is attached to the sleeve section, as by welding.

Figure 4:
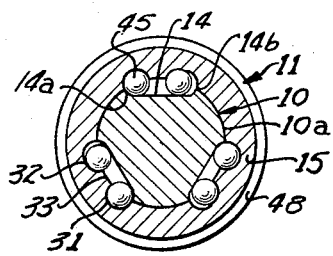
FIG. 4 is a transverse sectional view taken on the plane 4—4 of FIG. 1.

In use, torque may be applied either to the shaft 10 or to the torque tube 52 to drive one member from the other member and the sleeve and shaft members are free to slide relative to each other during transmission of torque from one member to the other. In the anti-friction type joint illustrated wherein both runs of each of the endless paths of ball elements are located at the interface of the shaft and sleeve, the width of the groove 14 in the shaft must be slightly greater than the spacing between the outer edges of the grooves 31 and 32 in the sleeve, so that, when the ball elements in one groove such as 32 in FIG. 3 and 31 in FIG. 4 engage the respective splines 14b and 14a on the shaft, the ball elements in the other groove of each pair are free to move in a direction opposite the direction of movement of the shaft relative to the sleeve. In order to compensate for the backlash which otherwise occurs in slip joints, the sleeve sections 15 and 16 are angularly adjustable relative to each other so that the ball elements in one sleeve contact one flange on the shaft while the ball elements on the other sleeve engage the relatively opposite flange on the shaft. As shown, the ball elements in the groove 31 in sleeve 15 contact flange 14a and the ball elements in groove 32 in sleeve 16 contact the flange 14b. Moreover, when ball races on the two sleeve sections are angularly adjusted relative to each other the ball elements in the other grooves, such as the grooves 32 in the sleeve 15 and the grooves 31 in the sleeve 16, are free to move in a direction opposite the direction of movement of the shaft relative to the sleeve. In addition, this angular adjustment of the anti-friction ball elements in the sleeves 15 and 16 relative to each other so that they contact relatively opposite edges of the grooves 14 in the shaft, also presses the ball elements radially outwardly into firm contact with the sleeve to radially center the sleeve on the shaft and thereby inhibit radial shifting therebetween. In the embodiment shown, only a small working clearance is provided between the cylindrical portion 10a of the shaft and the inner walls of the sleeve. However, a greater clearance can be provided, or may occur due to wear, and the ball elements will still radially support the shaft and sleeve relative to each other to inhibit radial shifting therebetween.

I claim:

1. A slip joint comprising a shaft member, a sleeve member extending around said shaft member having at least one longitudinally extending groove therein defining spaced apart splines, said sleeve member including first and second axially aligned sections, first and second key means on said first and second sections extending into said groove, and means for angularly adjusting said sleeve sections relative to each other whereby said first and second key means engage the splines at relatively opposite sides of the groove to reduce backlash between said members, said adjusting means including flange means on the adjacent ends of said sleeve sections, fasteners extending through said flange means for non-rotatably securing the sections together, and means on said flange means for turning one flange relative to the other.

2. A slip joint comprising a tubular sleeve antifriction ball carrier having first and second endwise aligned sleeve sections, each of said sleeve sections having at least one pair of longitudinally extending grooves formed in the inner face thereof and defining a guide rib therebetween, a shaft extending through said sleeve sections and having a longitudinally extending groove formed therein cooperable with said pair of grooves in the sleeve sections to define a pair of longitudinally extending guide ways in each sleeve section each separated by said guide rib in the sleeve sections, means at the end of each sleeve section defining arcuate guide ways extending crosswise of the longitudinal guide ways and interconnecting the same, first and second sets of anti-friction elements in said guide ways in each sleeve section, and means for angularly adjusting said sleeve sections relative to each other.

3. The combination of claim 2 wherein said adjusting means includes flange means on the adjacent edges of each of the sleeve sections, one of said flange means having circumferentially elongated slots extending therethrough, and fasteners extending through said slots and engageable with the other flange means for locking said sleeve sections together.

4. The combination of claim 3 including screws mounted on said one of the flange means and engageable with said fasteners for effecting positive angular adjustment of the sections relative to each other.

5. A slip joint for connecting two axially aligned sections of a drive shaft comprising, a shaft member forming a part of one of said drive shaft sections in axial alignment therewith, a first sleeve member on the other of said shaft sections in axial alignment therewith and extending around said shaft member, a second sleeve member extending around said shaft member, said shaft member having first and second angularly spaced longitudinally extending spline shoulders facing in relatively opposite circumferential directions, first and second key means on said first and second sleeve members respectively engageable with said first and second spline shoulders, sleeve member connecting and adjusting means carried solely by said sleeve members for rotation as a unit therewith, said connecting and adjusting means rigidly connecting said second sleeve member to said first sleeve member and including selectively adjustable means for angularly adjusting said first and second sleeve members relative to each other to press the key means on said first member against said first spline shoulder and the key means on said second member against said second spline shoulder to adjust the backlash between the sleeve members and the shaft member.

6. A slip joint for connecting two axially aligned sections of a drive shaft comprising, a shaft member forming a part of one of said shaft sections in axial alignment therewith, a first sleeve member on the other of said shaft sections in axial alignment therewith and extending around said shaft member, a second sleeve member extending around said shaft member, said shaft member having first and second angularly spaced longitudinally extending spline shoulders facing in relatively opposite circumferential directions, means on said first and second sleeve members defining first and second separate endless ball raceways, first and second separate sets of ball elements in said first and second raceways respectively, each set of ball elements being movable in an endless path separate from the ball elements in the other section, at least a portion of the ball elements of said first and second sets respectively engaging said first and second spline shoulders on said shaft member, sleeve member connecting and adjusting means carried solely by said sleeve members for rotation as a unit therewith, said connecting and adjusting means rigidly connecting said second sleeve member to said first sleeve member and including selectively adjustable means for angularly adjusting said first and second sleeve members relative to each other to press the ball elements of the first set against the first spline shoulder and the ball elements of the second set against the second spline shoulder whereby to adjust the backlash between the sleeve members and the shaft members.

References Cited in the file of this patent

UNITED STATES PATENTS 2,905,008    Sears _____ Sept. 22, 1959
2,908,152    Anderson _____ Oct. 13, 1959